United States Patent
Lee

(10) Patent No.: US 11,246,020 B2
(45) Date of Patent: Feb. 8, 2022

(54) SUBSCRIPTION-BASED V2X COMMUNICATION NETWORK FOR PRIORITIZED SERVICE

(71) Applicant: FORD GLOBAL TECHNOLOGIES, LLC, Dearborn, MI (US)

(72) Inventor: Yun Ho Lee, Pleasanton, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 203 days.

(21) Appl. No.: 16/292,938

(22) Filed: Mar. 5, 2019

(65) Prior Publication Data

US 2020/0288288 A1    Sep. 10, 2020

(51) Int. Cl.

| | | |
|---|---|---|
| H04W 4/60 | (2018.01) | |
| H04W 4/46 | (2018.01) | |
| H04W 4/44 | (2018.01) | |
| H04W 4/40 | (2018.01) | |
| H04L 29/12 | (2006.01) | |
| H04L 29/08 | (2006.01) | |
| G08G 1/0968 | (2006.01) | |
| G08G 1/0967 | (2006.01) | |
| G08G 1/048 | (2006.01) | |
| G06F 9/50 | (2006.01) | |

(52) U.S. Cl.
CPC ............ H04W 4/44 (2018.02); G06F 9/50 (2013.01); G08G 1/048 (2013.01); G08G 1/096827 (2013.01); H04W 4/46 (2018.02); H04L 61/6022 (2013.01)

(58) Field of Classification Search
CPC .... G06F 9/50; G08G 1/048; G08G 1/096827; G08G 1/096791; H04W 4/44; H04W 4/46; H04W 4/40; H04W 4/60; H04L 61/6022; H04L 61/2038
USPC ........................................................ 701/1
See application file for complete search history.

(56) References Cited

U.S. PATENT DOCUMENTS

| | | |
|---|---|---|
| 8,630,619 B2 | 1/2014 | Yi et al. |
| 9,306,924 B2 | 4/2016 | Lehmann |
| 9,667,806 B2 | 5/2017 | Johnson et al. |
| 9,668,133 B2 | 5/2017 | Kennedy |

(Continued)

OTHER PUBLICATIONS https://www.etsi.org/deliver/etsi_ts/122100_122199/122185/14.03.00_60/ts_122185v140300p.pdf (Year: 2017).*

*Primary Examiner* — Abby Y Lin
*Assistant Examiner* — Hossam M Abd El Latif
(74) *Attorney, Agent, or Firm* — Michael J. Spenner; Brooks Kushman P.C.

(57) ABSTRACT

Transportation infrastructure provides for vehicle-to-infrastructure (V2I) communication over a vehicle-to-everything (V2X) communication network with a V2X transceiver of a vehicle in accordance with a subscription level defining a level of access of the vehicle to data services of a cellular network. An interface controller operates as a gateway between the cellular network and the V2X communication network. A vehicle includes a transceiver for V2X communication. The transceiver provides for V2I communication over a V2X communication network with transportation infrastructure in accordance with a subscription level defining a level of access of the vehicle to a cellular network, and also provides for vehicle-to-vehicle (V2V) communication over the V2X communication network with other vehicles in accordance with the subscription level.

21 Claims, 3 Drawing Sheets

(56) References Cited

U.S. PATENT DOCUMENTS

| | | | |
|---|---|---|---|
| 2017/0032402 A1* | 2/2017 | Patsiokas | G06Q 30/0261 |
| 2020/0146048 A1* | 5/2020 | Lee | H04W 76/27 |
| 2020/0216001 A1* | 7/2020 | Chauncey | F02D 28/00 |
| 2020/0267518 A1* | 8/2020 | Sabella | H04W 48/16 |
| 2020/0280827 A1* | 9/2020 | Fechtel | H04W 4/80 |

* cited by examiner

SUBSCRIPTION-BASED V2X COMMUNICATION NETWORK FOR PRIORITIZED SERVICE

TECHNICAL FIELD

Aspects of the disclosure generally relate to a subscription-based vehicle-to-everything (V2X) communication network for prioritized V2X service.

BACKGROUND

V2X communication can include V2V (Vehicle to Vehicle) communication, V2I (Vehicle to Infrastructure) communication, V2P (Vehicle to Pedestrian) communication, and V2N (Vehicle to Network) communication, as some examples. V2X communication may be used for various purposes, such as for critical messages, driving assistant information, media or other entertainment information, public service announcement information, or on-demand information.

SUMMARY

In one or more illustrative examples, a system includes transportation infrastructure configured to provide for vehicle-to-infrastructure (V2I) communication over a vehicle-to-everything (V2X) communication network with a V2X transceiver of a vehicle in accordance with a subscription level defining a level of access of the vehicle to data services of a cellular network; and an interface controller configured to operate as a gateway between the cellular network and the V2X communication network.

In one or more illustrative examples, a system includes a vehicle including a transceiver for vehicle-to-everything (V2X) communication, the transceiver configured to provide for vehicle-to-infrastructure (V2I) communication over a V2X communication network with transportation infrastructure in accordance with a subscription level defining a level of access of the vehicle to a cellular network, and provide for vehicle-to-vehicle (V2V) communication over the V2X communication network with other vehicles in accordance with the subscription level.

In one or more illustrative examples, a method includes registering an initial subscription level of a vehicle to a vehicle-to-everything (V2X) communication network, the subscription level defining a level of access of the vehicle to data services of a cellular network; sending control parameters for the vehicle to network elements of the V2X communication network to implement the level of access; and responsive to a change in the subscription level of the vehicle to the cellular network updating the level of access, sending updated control parameters for the vehicle to the network elements to implement the updated level of access.

DETAILED DESCRIPTION

Figure 1:
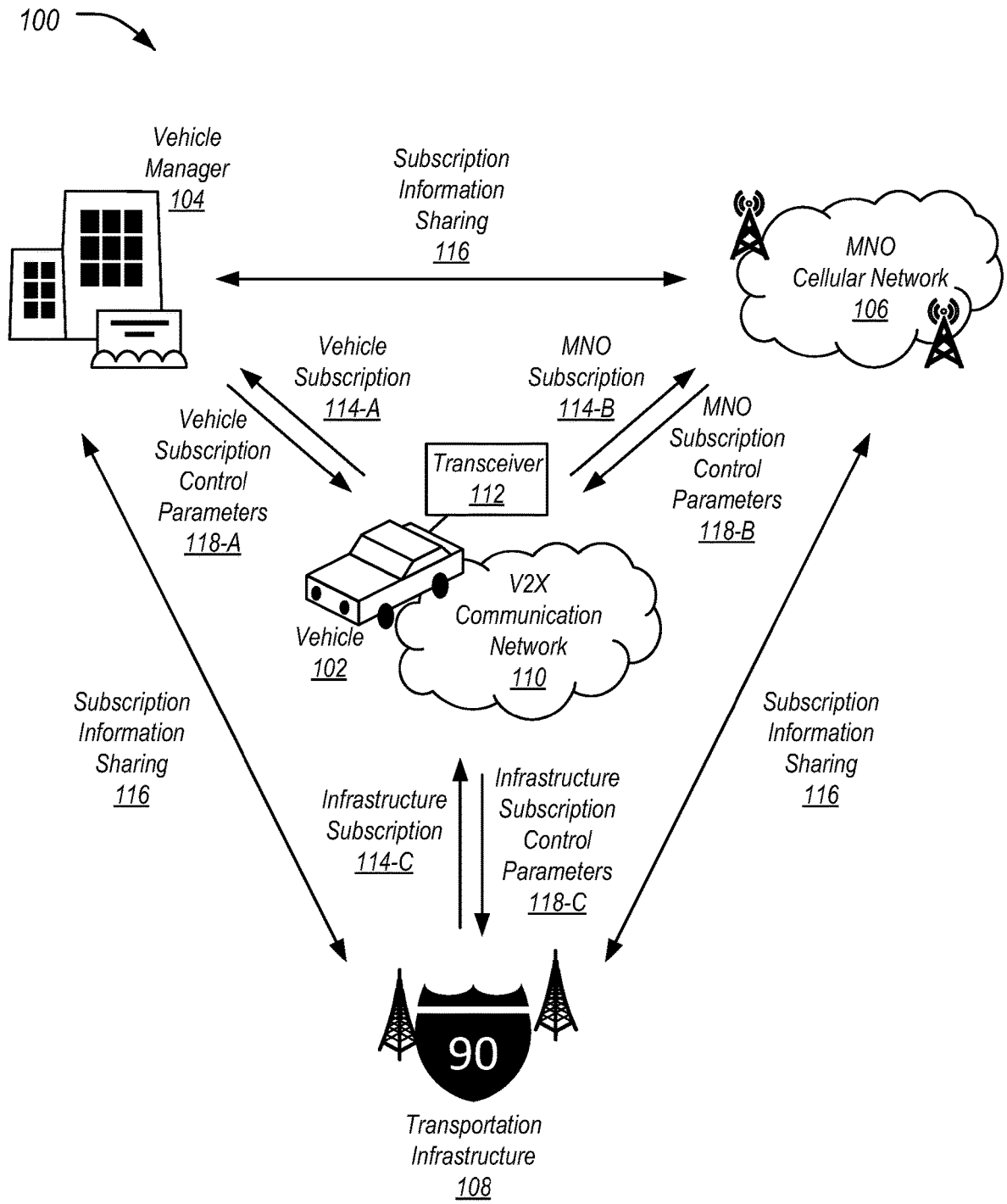
FIG. 1 illustrates an example of a subscription-based priority service for vehicles applied to a V2X communication network, including subscription registration and maintenance.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the case of V2N communication, mobile network operators (MNOs) such as Verizon or AT&T can be engaged to enable connectivity between vehicles and a network. Using a monetized or subscription-based plan for connectivity, these network operators can provide differentiated services and content to vehicles based on their available subscription plans.

In the case of V2V, V2I, and V2P communication, however, the V2X communication network is designed to share anonymous information, such as public safety information and safety critical information, without requiring an MNO service for data transmission. Because authentication and monitoring services of the MNO are not required for V2X, it is challenging for V2X communication to be controlled or monetized by the MNO service. For example, the Dedicated Short-Range Communications (DSRC) protocol and 3rd Generation Partnership Project (3GPP) Mode4 side-link use randomized media access control (MAC) address for anonymity. These systems are not designed to give customized service via the DSRC or 3GPP Mode 4 channel. In other words, these systems do not provide customized service through the V2X communication network.

Although network operation of V2X communication is different from that of cellular mobile networks, V2V, V2I, V2P could be considered to extend the operation of V2N networks, or vice-versa. Moreover, the possibility of customized information and information through V2V, V2P, and/or V2I may prove beneficial to vehicles. However, the V2X communication channel is typically band-limited, so such channels may have a limitation of a low maximum bandwidth or low data throughput as compared to cellular channels if the V2X communication channels are widely used. As an example of a service requiring large bandwidth-demanding service is the sharing of sensor data through a V2X communication network for use in driving assistant information. Such sensor data may include a large quantity from various sensors such as cameras, radar, lidar, ultrasonic sensors, etc. so such data could not be broadcast from a vehicle within the limited V2X communication network bandwidth. This may become more critical if the V2X communication network is available to the vehicles, but other networks such as the cellular network are not.

As described herein, a V2X communication network, such as V2V, V2P, V2I, etc., may be controlled and operated to provide customized information and service consistent with the operation of V2N and to use bandwidth with priority based on a subscription plan. To do so, as further described herein, subscription information may be maintained securely to allow for the use of customized and differentiated services from V2X communication networks such as DSRC or C-V2V.

FIG. 1 illustrates an example 100 of a subscription-based priority service for vehicles 102 applied to a V2X communication network 110, including subscription registration and maintenance. This service may be applied in order to obtain improved resources and customized service to the vehicles 102 from the V2X communication network 110. This subscription-based priority service can be operated by a MNO cellular network 106, an transportation infrastructure 108, or even a vehicle manager 104 such as manufacturer of the vehicles 102, with the MNO cellular network 106/transportation infrastructure 108/vehicle manager 104 working together to enable the customized services from the V2X communication network 110.

The vehicle 102 may include various types of automobile, crossover utility vehicle (CUV), sport utility vehicle (SUV), truck, recreational vehicle (RV), boat, plane, drone, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As yet a further possibility, the vehicle 102 may be an electric vehicle such as a battery-electric vehicle (BEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs or network identifiers.

The vehicle manager 104 may be an entity capable of providing vehicles 102 and subscription services for the vehicles 102. As some examples, the vehicle manager 104 may include an original equipment manufacturer (OEM), vehicle owner (e.g., fleet owner), vehicle rental provider, or municipality. The vehicle manager 104 may include hardware, such as one or more networked servers, that are configured to manage subscription information for the vehicles 102.

The MNO cellular network 106 is a communication network where the link to the subscriber (in this case the vehicles 102) is a wireless link. The MNO cellular network 106 may be distributed over land areas called cells, where each cell is served by at least one fixed-location transceiver. The MNO cellular network 106 may be referred to as the cellular network 106 or as the mobile network 106 in some cases.

The transportation infrastructure 108 refers to fixed installations that may be utilized by the vehicles 102. These installations may include installations that may be traversed by the vehicles 102, such as roads, railways, airways, waterways, canals and pipelines. These installations may also include installation terminals at which vehicles 102 may be stored, maintained, or otherwise managed, such as airports, railway stations, bus stations, warehouses, trucking terminals, refueling depots (including fueling docks and fuel stations), and seaports. Installations of the transportation infrastructure 108 may include communications components, such as DSRC transceivers, C-V2I transceivers, or Wi-Fi transceivers, to allow for the transportation infrastructure 108 to communicate with the vehicles 102.

The V2X communication network 110 includes a system of network components that facilitates communication with vehicles 102 by way of the V2V, V2I, and V2P technology. Example V2X technologies used by the network components may include, as some examples, DSRC or C-V2V components. In some examples, some or all of the functionality of the V2X communication network 110 may be made available through the hardware of the transportation infrastructure 108.

The vehicle 102 may include a transceiver 112 configured for wireless communication with networked components. In an example, the transceiver 112 may be configured to allow the vehicle 102 to communicate with the V2X communication network 110 via V2V, V2I, and V2P technology. In another example, the transceiver 112 may be configured to allow the vehicle 102 to communicate with over vehicles 102 via V2V communication.

As shown in the system 100, the vehicle 102 may subscribe to allow the transceiver 112 to utilize the V2X communication network 110. As shown, the subscription to the V2X communication network 110 may be performed through messaging to one or more of the vehicle manager 104, the cellular network 106, or the transportation infrastructure 108. For instance, the vehicle 102 may send one or more of a vehicle subscription request 114-A to the vehicle manager 104, a MNO subscription request 114-B to the cellular network 106, or an infrastructure subscription request 114-C to the transportation infrastructure 108. These subscription requests 114-A, 114-B, 114-C (collectively 114) may include information such as an identifier of the vehicle 102, and/or an identifier of a subscriber plan for the vehicle 102 to utilize for communication over the V2X communication network 110.

Responsive to one or more of these entities (the vehicle manager 104, the cellular network 106, or the transportation infrastructure 108) receiving one of the subscription requests 114, the receiving entity may share information regarding the subscriber plan to the other entities of the system 100, as indicated by the subscription information sharing messages 116. The subscriber information sharing messages 116 may be communicated between the vehicle manager 104, cellular network 106, and/or transportation infrastructure 108 through various communications channels, including the cellular network 106 itself.

Subscription control parameters 118 may be messages that include a secured indicator or token to indicate the subscription level of the vehicle 102 in the V2X communication network 110. For instance, vehicle subscription control parameters 118-A may be provided from the vehicle manager 104 to the V2X communication network 110. As another example, MNO subscription control parameters 118-B may be provided from the cellular network 106 to the V2X communication network 110. As yet a further example, infrastructure subscription control parameters 118-C may be provided from the transportation infrastructure 108 to the V2X communication network 110.

As a more specific example of the providing of subscription control parameters 118, the cellular network 106 may be configured to provide for transfer of larger amounts of data with less delay through the V2X communication network 110 by giving appropriate priority to data traversing a connection between the cellular network 106 and the V2X communication network 110. To make the information delivery from the cellular network 106 to the V2X communication network 110, the cellular network 106 may provide the MNO subscription control parameters 118-B from the cellular network 106 to the V2X communication network 110. In an example, the MNO subscription control parameters 118-B may include a secured indicator or token provided by the cellular network 106 to indicate the subscription level of the vehicle 102 in the V2X communication network 110. The MNO subscription control parameters 118-B may also be provided to the vehicle 102 from the cellular network 106 either over the V2X communication network 110 or through another network pathway (e.g., from the cellular network 106 without traversing the V2X communication network 110).

The subscription control parameters 118 may, accordingly, serve to modify the protocol used by the V2X communication network 110 to accommodate subscriber plans for the vehicles 102. These modifications may include, as some examples, controlling scheduling, bandwidth, and/or power level of the vehicle 102 communications with the V2X communication network 110. While the above example indicates that the subscription control parameters 118 may be received from the cellular network 106, the control signal/indication/token information may also be made available from the vehicle manager 104, in an example, through a software update. The transportation infrastructure 108 may also be configured to share the subscription control parameters 118 to provide an appropriate level of information transfer for the subscription level for a vehicle 102.

Regardless of source, responsive to the subscription control parameters 118 being applied to the V2X communication network 110 (e.g., to the network components of the transportation infrastructure 108) and to the vehicle 102, the vehicle 102 may be able to utilize an appropriate level of V2X communication network connectivity.

Figure 2:
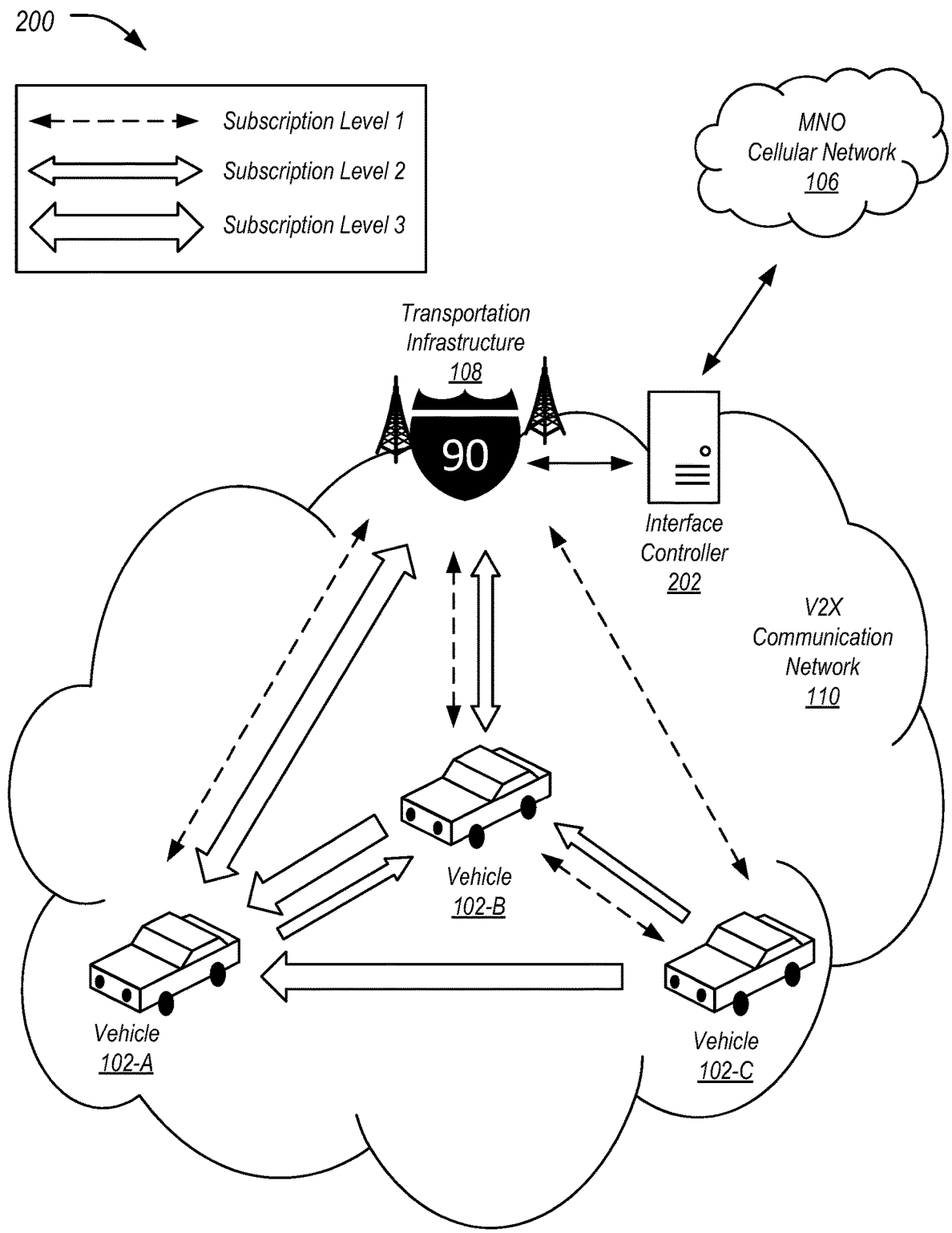
FIG. 2 illustrates an example of vehicles using the V2X connection network with different subscription levels.

FIG. 2 illustrates an example 200 of vehicles 102 using the V2X communication network 110 with different subscription levels. In the illustrated example 200, three subscription levels are shown, and three vehicles 102 are also shown. A first vehicle 102-A is assigned to the highest subscription level, subscription level three, which may include operation at a first resource allocation (e.g., a wide bandwidth, at high power, with the highest data priority, etc.) for the vehicle 102. A second vehicle 102-B is assigned to a lower subscription level, here subscription level two, in which the vehicle 102-B has less resource allocation than the first vehicle 102-A (e.g., less bandwidth, lower power, lower data priority, etc.). A third vehicle 102-C is assigned the lowest subscription level, here shown as subscription level 1, which may refer to a vehicle 102 that has no subscription plan to use data services of the V2X communication network 110. Regardless of the subscription level, public safety information and safety critical information may be made available. Accordingly, in the subscription level three, only such information is made available to the vehicle 102-C. While subscription-based connectivity may be applied for V2V communication as shown in the example 200 depending on the subscription level of the vehicle 102, it should be noted that the vehicles 102 themselves may also operate to facilitate communication, by providing communications services in accordance with the subscription levels of the vehicles 102 to neighbor vehicles 102 in the system 100.

It should be noted that the example 200 is only one possibility, and more, fewer, or differently organized subscription levels may be used. Additionally, while the example 200 includes three vehicles 102, it is contemplated that in practice systems would include any number of vehicles 102. Additionally, while not shown in the example 200, multiple vehicles 102 may be of the same subscription level.

In some V2X communication networks 110, it may be difficult to give greater benefit to a specific vehicle 102, such as wider bandwidth, higher power, dedicated high-priority timing schedule, better performing frequency band, etc., because V2X communication networks 110 are not designed for customized operation for each vehicle 102. However, as described in this disclosure, resources in the V2X communication network 110 may be allocated based on parameters of a connectivity operation for the subscription level, such as: when a signal will be transmitted (prioritized scheduling), which frequency band will be used for the signal transmission for avoiding interference, channel bandwidth (such as how wide a bandwidth would be used given certain frequency), power of transmission signal (higher power has better connectivity), repetition of the same signal (for better reception and quality of the signal), as some examples.

In some examples, an interface controller 202 may be included as a gateway between the cellular network 106 and the V2X communication network 110. The interface controller 202 may be configured to secure privacy of transmissions between the cellular network 106 and the V2X communication network 110. The interface controller 202 may also be configured to control the resources of the V2X communication network 110 for the subscription level such as bandwidth, power, frequency band, scheduling, etc. For instance, the interface controller 202 may assign randomized MAC addresses to the vehicles 102. To allow the vehicle 102 to use the randomized MAC for communication over the V2X communication network 110, the randomized MAC address may be assigned to the subscription level that embodies the subscription level of the vehicle 102. Notably, as the MAC addresses are randomized and vary over time, the risk of identity theft of the vehicle 102 is reduced.

The V2X communication network 110 may identify the subscription information of the vehicle 102. Based on the subscription level indicated by the subscription information, the vehicle 102 may obtain, from the V2X communication network 110, a higher priority schedule, a wider bandwidth, a higher power, a better frequency band, etc. to get better and customized services based on the available subscription plan. For instance, the vehicle 102 may transition from subscription level one to a higher subscription level.

Examples of the customized services may include, for instance, access to sensor data from another of the vehicles 102, real time traffic and road condition data with higher precision information as compared to the basic level of such data, or weather information of the vehicle 102 route including radar maps (which may require larger volumes of data in real or quasi-real time as compared to basic weather information).

For the specific example of sharing sensor data from a vehicle 102, the sharing vehicle 102 may receive compensation for the sharing by way of credit, points, data stored to a blockchain, etc., because the sharing vehicle 102 provided the sensor data to another vehicle 102 to satisfy the subscription level of the other vehicle 102. In most cases, it would be preferable for a vehicle 102 to have a real-time connection, higher reliability, wider bandwidth for large volume of data, low interference from another frequency band, etc. As another example, the vehicle 102 that subscribes to a subscription plan may use the customized information for one or more of: (i) improved critical information, (ii) improved driving assistant technology, or (iii) additional entertainment options, for instance.

With improved information with respect to real-time road condition and other vehicle 102 sensor data and routing, the vehicle 102 may be able to provide better route suggestions for reduced travel time and/or reduced fuel consumption. In another example, the vehicle 102 may utilize additional environmental information (e.g., real-time video) to improve the vehicle 102 adjustments to road conditions. In yet a further example, the vehicle 102 may be able to provide for video streaming of entertainment through the V2X communication network 110, even when there is no cellular network 106 available.

For basic critical messages, public service information, or alerts such as AMBER alerts, that information may be provided from the V2X communication network 110 as a default regardless of vehicle 102 subscription plan (e.g., within subscription level one). The subscription plans may be multi-level plans, where each subscription level may include a different priority of traffic for dissemination via the interface controller 202 of the V2X communication network 110.

Figure 3:
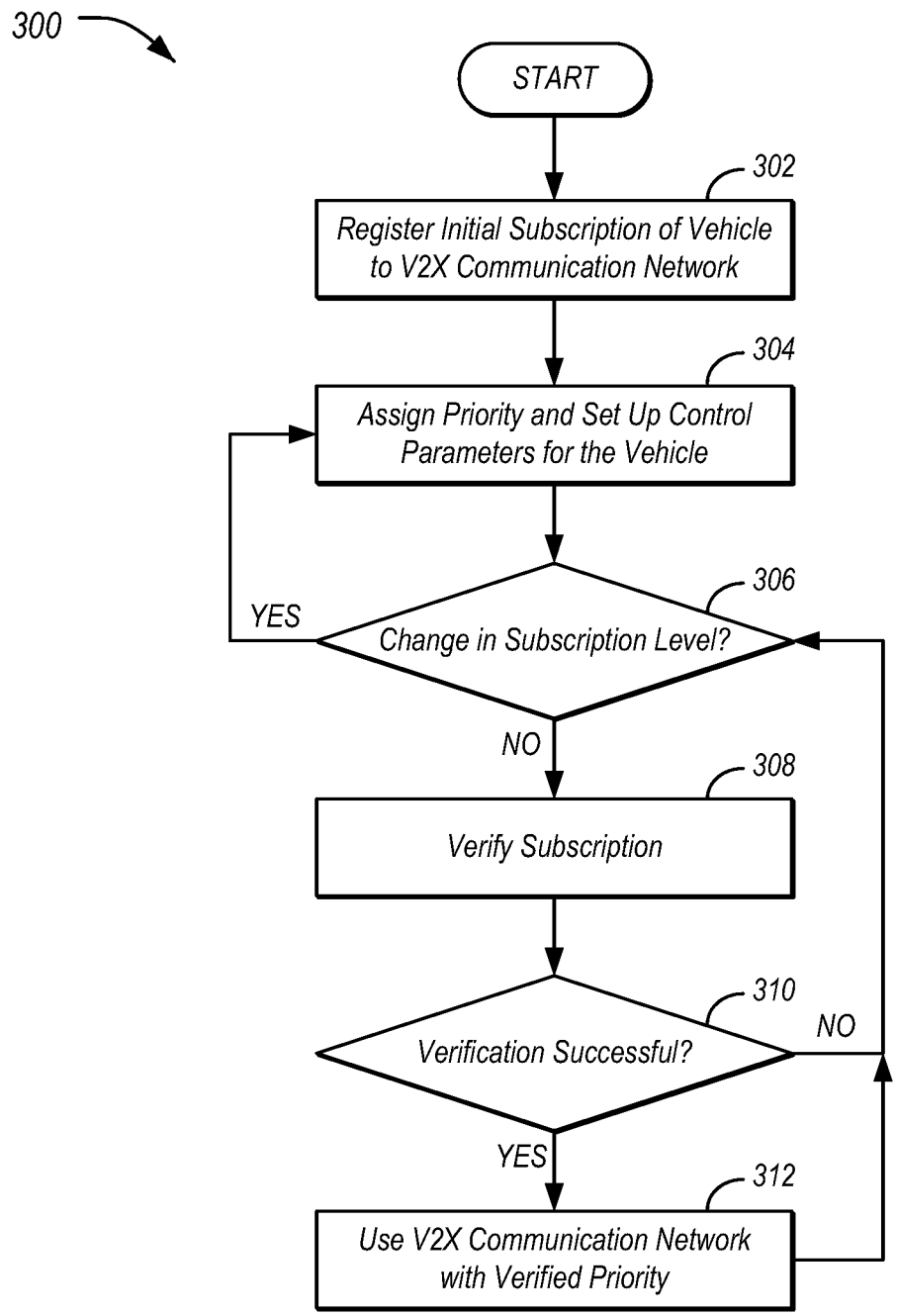
FIG. 3 illustrates an example process for the use of the V2X communication network by a vehicle.

FIG. 3 illustrates an example process 300 for the use of the V2X communication network 110 by a vehicle 102. As explained in further detail below, the process 300 allows for appropriate subscription level check-ups and verifications to be performed to ensure an appropriate level of service to the vehicle 102.

At operation 302, the V2X communication network 110 registers an initial subscription of the vehicle 102. In an example, the transportation infrastructure 108 of the V2X communication network 110 makes an initial assignment of the vehicle 102 to subscription level one.

The V2X communication network 110 assigns a priority and sets up control parameters for the vehicle 102 at 304. In an example, based on the assignment of the vehicle 102 to a subscription level, the transportation infrastructure 108 provides subscription control parameters 118 to the network elements of the V2X communication network 110 to ensure that communications of the vehicle 102 are treated according to the correct subscription level of the vehicle 102.

At operation 306, the V2X communication network 110 determines whether a change has been made in the subscription level of the vehicle 102. In an example, a subscription request 114 may be received from one or more of the vehicle manager 104, the cellular network 106, or the transportation infrastructure 108. If such a message has been received, control returns to operation 304 to reassign the priority of the vehicle 102. If not, control passes to operation 308.

The transportation infrastructure 108 verifies the subscription of the vehicle 102 at 308. In an example, the transportation infrastructure 108 may access account data of the vehicle 102 to ensure that a randomized media access control (MAC) of the vehicle 102 corresponds to the subscription level to be delivered.

At 310, the transportation infrastructure 108 determines whether the verification of the subscription was successful. If so, control passes to operation 312 to use the V2X communication network 110 with the priority of the vehicle 102 as verified for the subscription of the vehicle 102. After operation 312, control returns to operation 306. If verification of the subscription was unsuccessful, control returns to operation 306.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
  transportation infrastructure configured to
    support a plurality of subscription levels defining levels of access to data services of a cellular network including: (i) a first level in which public safety information and critical information are available for receipt by vehicles but not data services requested by vehicles; (ii) a second level in which the information at the first level is available with the data services at a first resource allocation; and (iii) a third level in which the information at the first level is available with the data services at a second resource allocation, the second resource allocation being greater than the first resource allocation, receive an infrastructure subscription request from a vehicle, the infrastructure subscription request identifying the vehicle and a subscription plan of the vehicle indicative of one of the plurality of subscription levels, provide for vehicle-to-infrastructure (V2I) communication over a vehicle-to-everything (V2X) communication network with a V2X transceiver of the vehicle in accordance with the one of the plurality of subscription levels indicated by the infrastructure subscription request, including to send subscription control parameters for the vehicle to network elements of the V2X communication network to accommodate, in the V2X communication network, the level of access of the vehicle to the data services of the cellular network; and an interface controller configured to operate as a gateway between the cellular network and the V2X communication network.

2. The system of claim 1, wherein the V2I communication is provided using one or more of Dedicated Short Range Communications (DSRC) protocol or 3rd Generation Partnership Project (3GPP) Mode4 side-link.

3. The system of claim 1, wherein the first resource allocation and the second resource allocation each includes one or more of a bandwidth size for the communication, a power level for the communication, or a data priority for the communication.

4. The system of claim 1, wherein the data services include sensor information from a second vehicle, and the second vehicle receives credits for sharing the sensor information with the vehicle.

5. The system of claim 1, wherein the data services include environmental information to improve adjustments made by the vehicle to road conditions.

6. The system of claim 1, wherein the data services include streaming media.

7. The system of claim 1, wherein the transportation infrastructure is further configured to receive subscription information defining the subscription level for the vehicle from the cellular network.

8. A system comprising:
a vehicle including a transceiver for vehicle-to-everything (V2X) communication, the transceiver configured to
send a subscription request, the subscription request identifying the vehicle and a subscription plan of the vehicle indicative of one of a plurality of subscription levels including
(i) a first level in which a base level of information is available for receipt by the vehicle but not data services requested by the vehicle,
(ii) a second level in which the information at the first level is available with the data services at a first resource allocation, and
(iii) a third level in which the information at the first level is available with the data services at a second resource allocation, the second resource allocation being greater than the first resource allocation, in accordance with one of the plurality of subscription levels defining a level of access of the vehicle to a cellular network, provide for vehicle-to-infrastructure (V2I) communication for data communications of the vehicle over a V2X communication network with transportation infrastructure that supports a plurality of subscription levels as configured according to the one of a plurality of subscription levels indicated by the subscription request, and provide for vehicle-to-vehicle (V2V) communication over the V2X communication network with other vehicles in accordance with the one of the plurality of subscription levels.

9. The system of claim 8, wherein the vehicle is further configured to provide for communication over the cellular network in accordance with the one of the plurality of subscription levels.

10. The system of claim 8, wherein the V2X communication,
including the V2I communication, is provided using one or more of Dedicated Short Range Communications (DSRC) protocol or 3rd Generation Partnership Project (3GPP) Mode4 side-link.

11. The system of claim 8, wherein each of the first resource allocation and the second resource allocation includes one or more of a bandwidth size for the communication, a power level for the communication, or a data priority for the communication.

12. The system of claim 8, wherein the data services include receipt of sensor information from a second vehicle, the vehicle is configured to utilize the sensor information to provide route suggestions optimized to reduce one or more of travel time or fuel consumption, and the second vehicle receives credits for sharing the sensor information with the vehicle.

13. The system of claim 8, wherein the data services include receipt of environmental information, and the vehicle is configured to utilize the environmental information to improve adjustments made by the vehicle to road conditions.

14. The system of claim 8, wherein the data services include receipt of streaming media entertainment.

15. A method comprising:
registering an initial vehicle subscription level of a vehicle to a vehicle-to-everything (V2X) communication network, the V2X communications network supporting a plurality of subscription levels including (i) a first level in which a base level of information is available for receipt by the vehicle but not data services requested by the vehicle, (ii) a second level in which the information at the first level is available with the data services at a first resource allocation, and (iii) a third level in which the information at the first level is available with the data services at a second resource allocation, the second resource allocation being greater than the first resource allocation, the initial vehicle being one of the plurality of subscription levels and defining a level of access of the vehicle to the data services of a cellular network;

sending control parameters for the vehicle to network elements of the V2X communication network to implement, in the V2X communication network, the level of access of the vehicle to the data services of the cellular network; and responsive to a change in the subscription level of the vehicle to the cellular network updating the level of access, sending updated control parameters for the vehicle to the network elements to implement, in the V2X communication network the updated level of access.

16. The method of claim 15, wherein the vehicle is assigned a randomized media access control (MAC) address for anonymity, and further comprising verifying the MAC address corresponds to the vehicle.

17. The method of claim 15, wherein, for the initial subscription level, the base level of information is available for receipt by the vehicle but not data services requested by the vehicle, and, for the second level and the third level, the information at the initial subscription level is available along with the data services.

18. The method of claim 17, wherein the updated level of access is received from the cellular network and indicates an updated resource allocation for communication by the vehicle over the V2X communication network, the updated resource allocation specifying one or more of a bandwidth size for the communication, a power level for the communication, and a data priority for the communication.

19. The system of claim 1, wherein the transportation infrastructure is further configured to:
receive a second infrastructure subscription request for a second vehicle, the second infrastructure subscription request identifying the second vehicle and a second subscription plan indicative of a second one of the plurality of subscription levels,
provide for vehicle-to-infrastructure (V2I) communication over the vehicle-to-everything (V2X) communication network with a second V2X transceiver of a second vehicle in accordance with the second one of the plurality of subscription levels indicated by the second infrastructure subscription request, including to send second subscription control parameters for the second vehicle to the network elements of the V2X communication network to accommodate, in the V2X communication network, and
direct the vehicle to further provide for vehicle-to-vehicle (V2V) communication with a V2V transceiver of the second vehicle in accordance with the second one of the plurality of subscription levels.

20. The system of claim 8, wherein the transceiver is further configured to:
provide for vehicle-to-vehicle (V2V) communication for data communications of the vehicle over the V2X communication network with other vehicles in accordance with the one of the one of the plurality of subscription levels, and
provide for V2V communication over the V2X communication network for data communications of the other vehicles in accordance with respective subscription levels of the other vehicles to the data services of the cellular network.

21. The method of claim 15, further comprising
receiving the control parameters from the cellular network; and
utilizing the control parameters from the cellular network for controlling scheduling, bandwidth, and/or power level of the vehicle communications with the V2X communication network.

* * * * *